United States Patent

Busch

[15] 3,665,227

[45] May 23, 1972

[54] ELECTRIC MOTOR

[72] Inventor: Raymond W. Busch, 1701 N.W. 54th Terrace, Lauderhill, Fla. 33313

[22] Filed: Nov. 3, 1970

[21] Appl. No.: 86,466

Related U.S. Application Data

[63] Continuation-in-part of Ser. No. 815,371, Apr. 11, 1969, abandoned.

[52] U.S. Cl. .............................. 310/46, 310/154, 310/237, 310/267
[51] Int. Cl. ..................................................... H02k 37/00
[58] Field of Search ..................... 310/46, 154, 268, 267, 40, 310/83, 89, 43, 67, 237, 42

[56] References Cited

UNITED STATES PATENTS

| | | | |
|---|---|---|---|
| 3,426,224 | 2/1969 | Esters | 310/46 |
| 3,603,823 | 9/1971 | Mason | 310/46 |
| 3,354,333 | 11/1967 | Henry-Baudot | 310/267 X |
| 1,068,531 | 7/1913 | Rhodes | 310/83 X |
| 2,752,517 | 6/1956 | Von Delden | 310/89 |
| 2,623,187 | 12/1952 | Adams | 310/154 |
| 3,535,566 | 10/1970 | Smith | 310/67 |
| 3,534,203 | 10/1970 | Sommeria | 310/46 X |

*Primary Examiner*—D. F. Duggan

[57] ABSTRACT

An electric motor module for converting electromagnetic energy into rotational mechanical energy having at least one snap-in electromagnetic coil fixed radially about a rotating member on a shaft with the north-south polar axis disposed circumferentially relative to the shaft. A printed or laminated circuit plate takes the place of the usual hub commutator and is fastened on one side of the member to complete the circuit with the coil. The shaft is rotatably coupled to a transparent frame having a plurality of fixed magnetic members also having their north-south polar axis circumferentially disposed about the shaft and sufficiently adjacent said coil to provide magnetic interaction between the coil and the fixed magnetic members for rotating the shaft. Contact members mounted on one or both side plates constituting the frame extend to the contact surface of the circuit plates thereby completing the circuit for the reception of electrical current. Terminal posts also used as plugs either receive current wire or a negative wire for use of electricity or plug into another module to multiply the H.P. rating of the motor.

8 Claims, 10 Drawing Figures

PATENTED MAY 23 1972
3,665,227
SHEET 1 OF 4
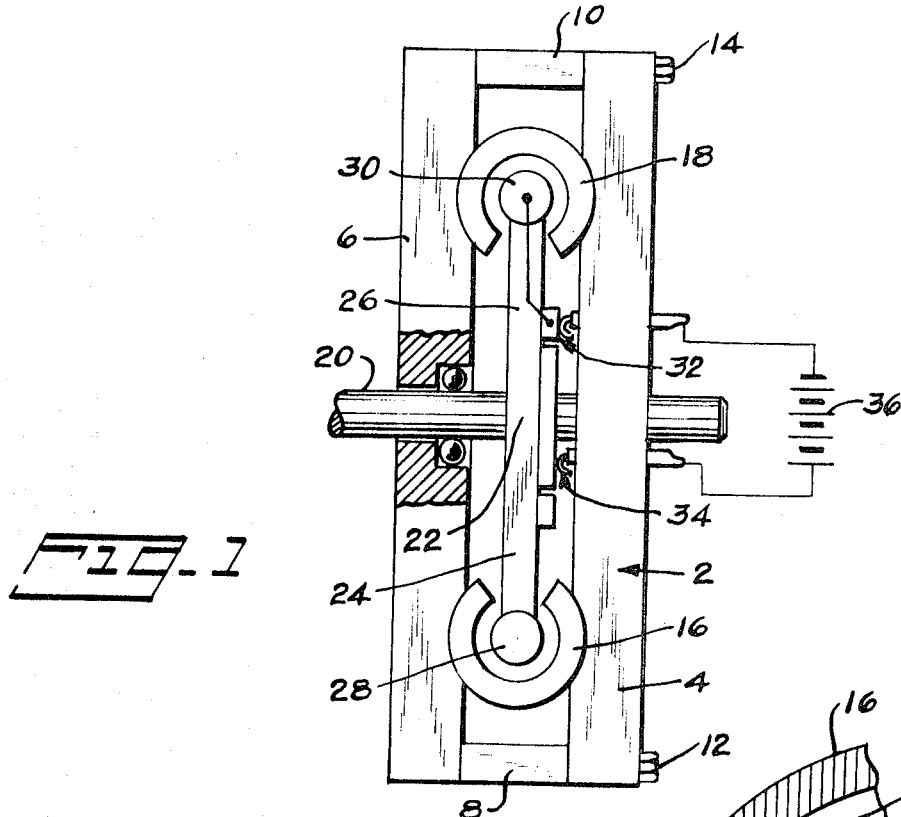
FIG. 1
FIG. 2
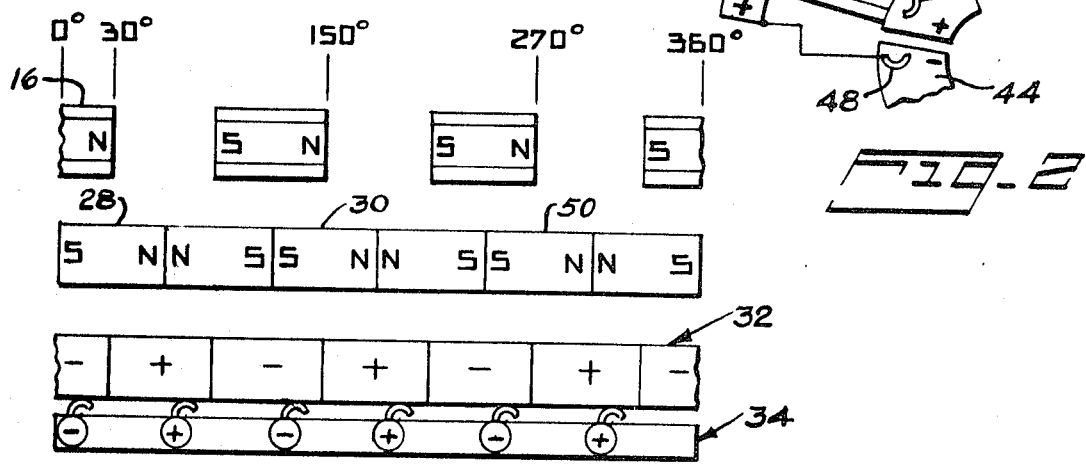
FIG. 3
INVENTOR.
BUSCH RAYMOND
BY
ATTORNEY

INVENTOR.
RAYMOND W. BUSCH

INVENTOR.
RAYMOND W. BUSCH

INVENTOR.
RAYMOND W. BUSCH

ELECTRIC MOTOR

CROSS-REFERENCE TO CO-PENDING APPLICATION

This application is a continuation-in-part of Ser. No. 815,371 filed Apr. 11, 1969, now abandoned.

BACKGROUND OF THE INVENTION

This invention relates to an improved electric motor-generator, and, more particularly, to a novel electric motor-generator having coils passing through generally arcuate cylindrical openings in the magnetic members.

As is perhaps well-known, a variety of electric motor-generator designs and assemblies have been utilized in the past. Various designs have been perfected to improve torque, current output, or cost of construction.

SUMMARY OF THE INVENTION

The present invention relates to a new and improved electric motor-generator design. The electric motor-generator includes a shaft, a rotating member with snap-on coils, magnetic members in a casing. The coils pass through generally C-shaped magnetic members. The mouth of the magnetic member provides an opening for the arm to pass through as the coil passes through the opening in the magnetic member. A transparent casing surrounds the shaft, hub, coils, and magnetic members. The magnetic members provide a generally cylindrical opening having an accurate central line identical to the path of the coil.

It is an object of this invention to provide an improved design and assembly for an electric motor-generator.

It is another object of this invention to provide a non-complex, easy to assemble, low cost electric motor-generator.

It is another object of this invention to provide an electric motor-generator which will not require starter windings and contact clutch on its rotor shaft.

It is a further object of this invention to provide a motor for A.C. D.C. and polyphase operations.

In accordance with these and other objects which will be apparent hereinafter, the instant invention will now be described with particular reference to the accompanying drawing.

BRIEF DESCRIPTION OF THE DRAWING

In the Drawing:

FIG. 1 is a side view of the electric motor-generator partially in cross-section;

FIG. 2 is a front elevation of a coil passing through a magnetic member;

FIG. 3 is an illustration of the connection between the contacts and the coils;

DESCRIPTION

Figure 4:
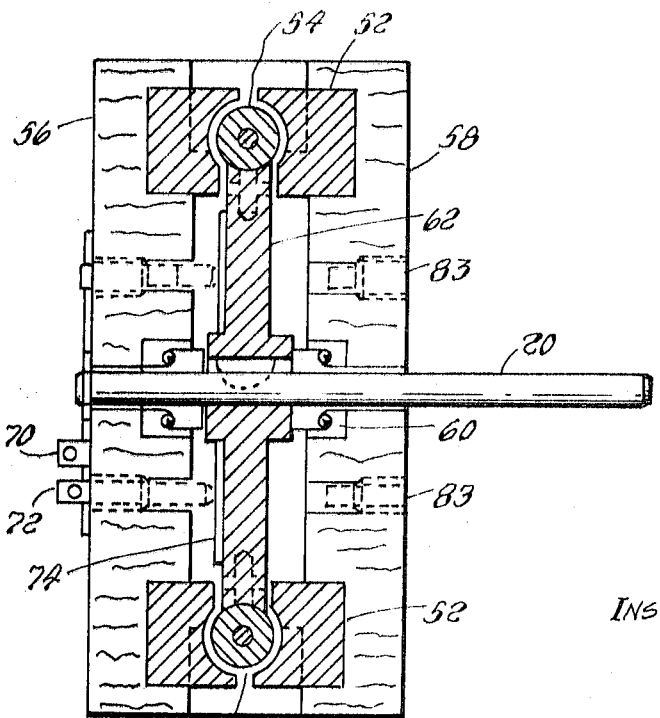
FIG. 4 is a cross-section of another embodiment of the invention.

Referring now in detail to the drawing, and, referring, particularly to FIG. 1, the housing generally designated as numeral 2 includes side plate 4 and side plate 6 connected together by spacer blocks. Spacer block 8 and spacer block 10 are illustrated in the drawing. The side plates 4 and 6 are connected together by bolts or screws 12 and 14. A plurality of magnets are spaced between the side plates. The generally C-shaped magnet 16 and 18 are shown in FIG. 1. A third C-shaped magnet not shown, is attached between the plates 4 and 6. A shaft 20 rotates in bearings in the side plates. The shaft carries a hub at 22 having spokes 24 and 26 connected thereto. The hub carries a third spoke, not shown, with a coil, not shown, at its distal end. Coils 28 and 30 are connected to the distal ends of spokes 24 and 26 respectively.

The coils are electrically connected to contact plate generally designated as numeral 32. Contacts, generally designated as numeral 34, pass electricity from a battery 36 or any other electrical source to the coils. The changing fields in the coils set up a magnetic field that is in opposition during flight to the field of the permanent magnets and provides the source of energy for an electric motor.

When the shaft 20 is driven, through the permanent magnets, the coils passing through the magnetic fields will produce the electricity that passes out the generator through ordinary contact points.

Referring to FIG. 2, magnet 16 is shown partially cross-section, showing the generally arcuate cylindrical opening 40. The coil 28 at the distal end of arm 24 passes through the arcuate cylindrical opening 40. Two contact plates 42 and 44 are illustrated with contact fingers or brushes 46 and 48 engaging the plates in order to pass electricity to or from the coils.

Referring now to FIG. 3, showing a two dimensional layout of the six contact fingers 34 connected to a plurality of contact plates 32. The contact plates are electrically connected to the three coils 28, 30 and 50. The coils pass through permanent magnets 16, 18 and 52. The contact plates 32 are rotating with the coils in order to change the polarity of the coils in the ordinary manner.

The electric motor-generator is designed in a module form, as shown in FIG. 1. A plurality of modules may be connected one to the other to provide greater horsepower output or electrical power output. The shafts may be linked together therefore the horsepower output can be increased by adding one, two, or more units of the module to the originally purchased electric-motor generator. When a plurality of modules are connected to the original module, as shown in FIG. 1, each contact plate on the added modules are positioned to provide a smooth running motor or generator as well known in the art.

The module motor-generator design may include a non-complex switching circuit to switch the module from a motor operation to a generator operation or from a generator operation to a motor operation.

It should be noted that the permanent magnet may be replaced by a magnetic field generated by an electric coil. As is well known, electricity passing through a coil creates a magnetic field. Here the coils are activated by passing through the magnetic coil and by bridging the space between the magnet ends by continuous magnetic torque, thus utilizing one-half of continuous windings in ordinary wound rotor and no windings in the stator.

By replacing the motor's magnets by another set of magnets magnetized transaxially from motor's magnetic field direction, the motor can be converted into an AC or DC current-producing generator. This can be done by connecting a 3,600 RPM motor to the shaft or by securing two magnets with opposing fields at 180° to one another in the housing's wall for the coils to pass through.

Figure 6:
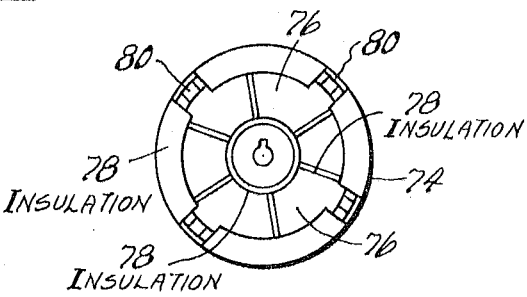
FIG. 6 is a plan view of the printed circuit disc for the assembly of FIG. 4.
Figure 5:
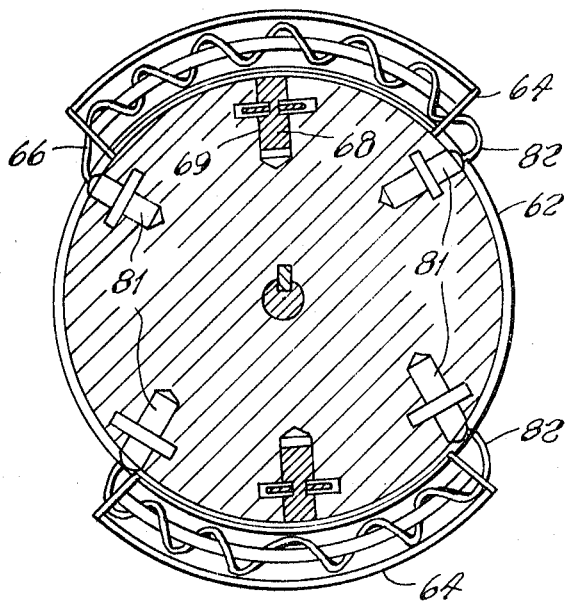
FIG. 5 is a cross-section of the rotating member for the embodiment of FIG. 4, through B—B.
Figure 7:
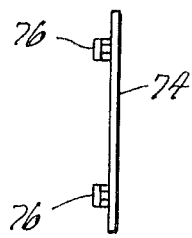
FIG. 7 is a side view thereof.

Referring to FIG. 4, the same shows another embodiment characterized by the use of C-shaped magnets 52. The shape of these magnets gives an enlarged surface area resulting in a greater flux density as each facing magnet is of the same polarity, this compresses the field of each magnet and tends to cause a denser flux in the enclosed circular area 54 which the facing magnets define. As shown, this modification has front plate 56 and rear plate 58, the facing upper and lower ends of which have secured thereto magnets 52. Shaft 20 is journalled in openings in the two plates and rotates on ball bearings 60. Keyed on shaft 20 is rotor 62, better seen on FIG. 5. Secured on its periphery are tellurium or copper casings 64 enclosing coil windings 66 wound about a coil core of soft iron. A sheet of insulated material insulates the casing from the coil winding itself also insulated from the core. The coil unit can also have its coil molded in plastic. The casings are secured to the rotor by means of lugs 68 fitting in slots 69 in the rotor. Front plate 56 has electrical brushes 70(+) and 72(−). Opposite these brushes (6) is a disc 74 with a printed or etched circuit. Disc 74 is best seen in FIGS. 6 and 7. Disc 74 is snapped on rotor 62 by means of two connector tab fitting slots in the rotor. Disc 74 has divisional segments each insulated from one another. The contact segments are referenced 76 and the insulation is 78. Slots 80 are provided on the periphery of the disc for receiving male plugs 81 at the end of a wire 82 connected to the coil unit.

In the rear plate are provided openings 83 for receiving therein contact studs from another module.

Figure 8:
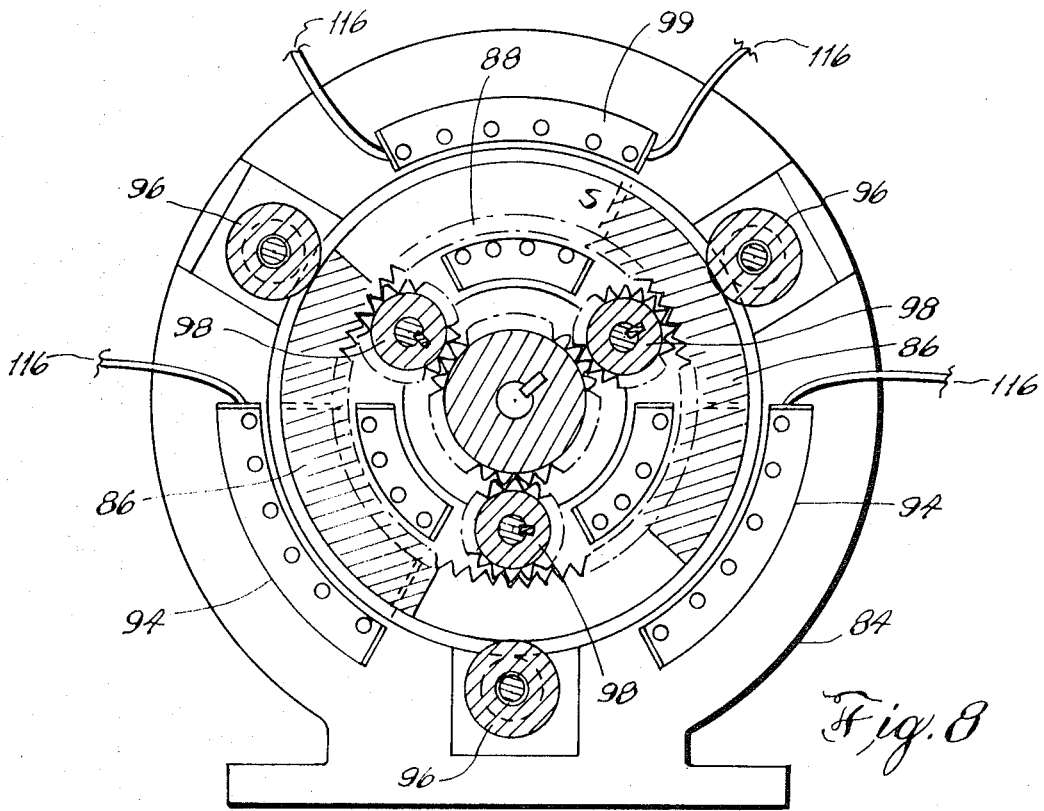
FIG. 8 is a front view of another embodiment of the invention.
Figure 9:
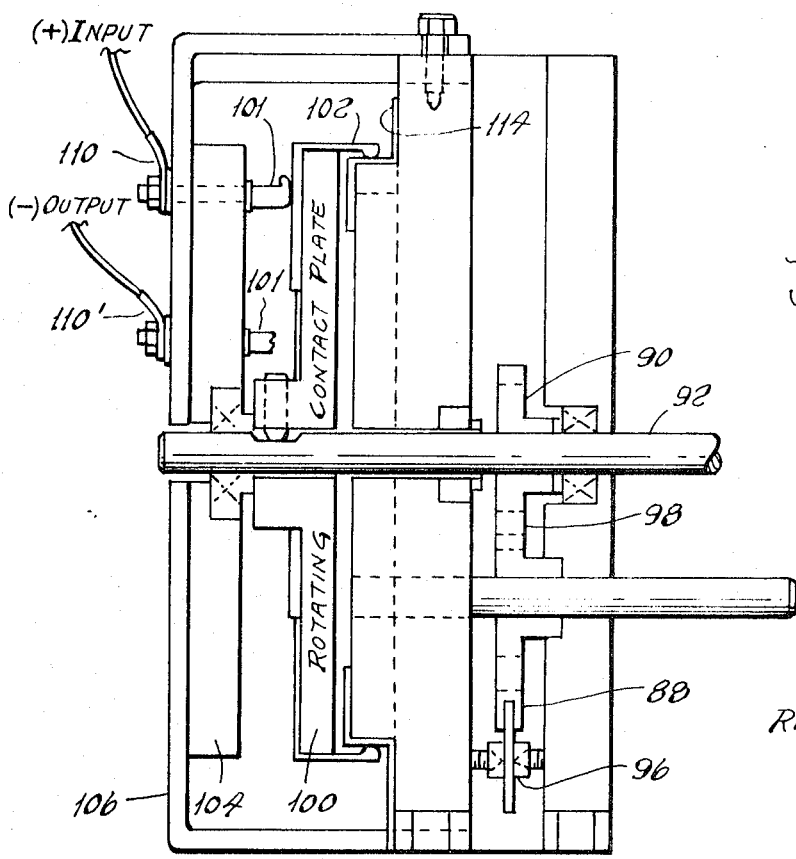
FIG. 9 is a partially cross-sectional view taken through 8—8 of FIG. 8.
Figure 10:
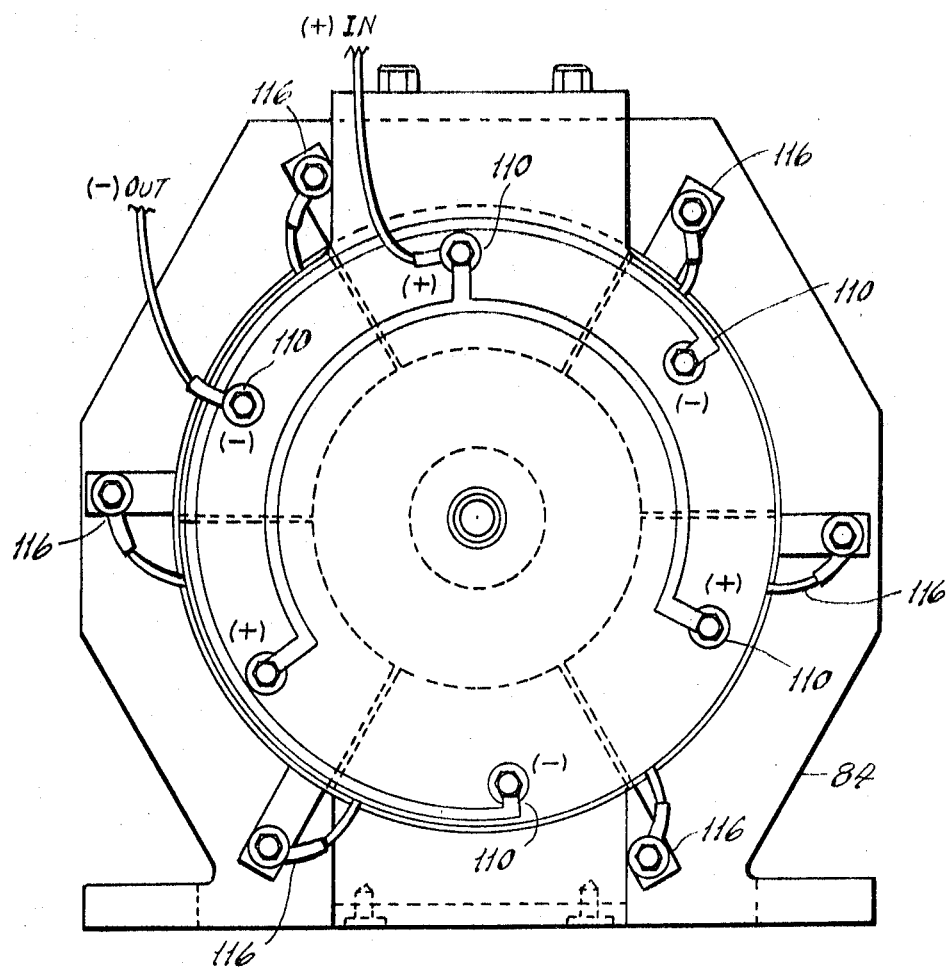
FIG. 10 is a plan view of the back of the assembly of FIG. 8.

FIGS. 8–10 show a further embodiment of the invention in which the rotor is a ring gear with internal toothing which minimizes friction on the rotor shaft. In this embodiment, the housing 84 is of heat resistant, transparent material. Equally spaced coil magnets 86 are carried by ring gear 88 enmeshed with central working gear 90 keyed on shaft 92. Three tubular coils 94 are sandwiched in the housing's plates. Three point mounted idler wheels 96 are equally spaced around the ring gear or rotor to adjust and center it. Essentially these replace the ball bearings of the other embodiments as wheels which are axially point centered, minimize friction and provide less drag resistance. Also in mesh with ring gear 88 are intermediate planetary gears 98 keyed on stationary shafts. These gears give equally supported balance to the transmission applied by the ring gear and also continue directional drive transmission to central gear 90.

Rotating with shaft 92 to transfer current is plate 100 divided into 6 segments each connected to a contact finger 102. A stationary contact plate 104 is secured to support bracket 106 with 6 contact brushes 101 ending in terminals 110 with wires to tabs to complete the circuit. The hub of back plate 112 faces contact plate 100. Contact tab leads 114 lead from six segments. Coil end wires 116 provide electrical contact with coils 94. The gears 98 rotate when the module is used as a generator. The gears 98 are driven by the ring gear when the module is used as a motor.

The provision of six segments in the contact plates of the two preceding embodiments insures an overlap of the magnetic fields at any point where the rotor stops. Thus a starting lead is provided under one of the six contact fingers at all times to give instantaneous starting.

A motor module and a generator module according to the invention can be sandwiched together to provide additional power or current, as desired.

The instant invention has been shown and described herein in what are considered to be the most practical and preferred embodiments. It is recognized, however, that departures may be made therefrom within the scope of the invention. Therefore, the instant invention is not to be limited to the details discussed herein but to be accorded the full scope of the claims so as to embrace any and all equivalent apparatus and articles.

What is claimed is:

1. An electric motor comprising:
    a stator frame; contact brushes in said frame;
    a shaft rotatably mounted in said frame;
    a rotor keyed on said shaft surrounded by said frame;
    a plurality of individual electromagnetic coils plugged in said rotor and spaced from the axis of said shaft and moveable in a circumferential path about said shaft, the magnetic north-south polar axis of each coil aligned substantially circumferentially about said shaft axis;
    a disc-like commutator carrying a printed circuit removably mounted on said rotor, said disc having alternate insulated and conductive areas and being contacted by said brushes;
    a plurality of magnetic members in said frame, the magnetic north-south polar axis of each member aligned substantially circumferentially to said shaft axis and sufficiently adjacent the path of said coils to electromagnetically interact with said coils.

2. A motor according to claim 1, wherein said magnetic members are of general "c" shape and are positioned opposite one another thereby defining an "o" shaped arcuate path in which said rotor rotates whereby maximum flux density is provided, said stator frame completely surrounding said members.

3. A motor according to claim 1, wherein said rotor consists of a ring gear having internal toothing, there being a central gear keyed on a rotating shaft in said frame and equally spaced planetary gears mounted on stationary shafts between the ring gear and the central gear, said planetary gears being enmeshed with said ring gear and said central gear.

4. A motor according to claim 3, having a contact plate with a plurality of contact fingers, said plate rotating with said rotating shaft.

5. A motor according to claim 3 wherein said frame is of transparent, heat resistant plastic.

6. A motor according to claim 1, wherein said coils are encased in a tellurium-copper casing with a sheet of insulating material between the coils and the casing.

7. A motor according to claim 1, wherein said coils are encased in a plastic casing.

8. A motor according to claim 3 having a plurality of equally spaced idler wheels in contact with the outer periphery of said ring gear for minimizing friction.

* * * * *